United States Patent
Fowler et al.

(10) Patent No.: US 9,159,036 B2
(45) Date of Patent: Oct. 13, 2015

(54) EMBEDDED GAMER CARD ACROSS MULTIPLE DEVICES AND NETWORKS

(75) Inventors: J. Clinton Paul Fowler, Seattle, WA (US); Dax H. Hawkins, Kirkland, WA (US); John M. Gehlsen, Redmond, WA (US); Michal Bortnik, Seattle, WA (US); Steven D. Lamb, Woodinville, WA (US); Walter Reed Rector, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1057 days.

(21) Appl. No.: 11/282,374

(22) Filed: Nov. 18, 2005

(65) Prior Publication Data

US 2007/0130150 A1 Jun. 7, 2007

(51) Int. Cl.
G06F 17/30 (2006.01)
G06Q 10/00 (2012.01)
A63F 13/30 (2014.01)
G07F 17/32 (2006.01)

(52) U.S. Cl.
CPC .............. *G06Q 10/00* (2013.01); *A63F 13/12* (2013.01); *A63F 13/30* (2014.09); *G06F 17/30377* (2013.01); *G06F 17/30581* (2013.01); *G07F 17/32* (2013.01); *G07F 17/3232* (2013.01); *A63F 2300/5546* (2013.01); *A63F 2300/5553* (2013.01); *A63F 2300/577* (2013.01)

(58) Field of Classification Search
USPC ............ 707/609, 610, 613, 624, 622; 463/42, 463/43
See application file for complete search history.

(56) References Cited

U.S. PATENT DOCUMENTS

| | | | |
|---|---|---|---|
| 6,106,395 A | 8/2000 | Begis | |
| 6,352,479 B1 * | 3/2002 | Sparks, II | 463/42 |
| 6,442,590 B1 * | 8/2002 | Inala et al. | 709/204 |
| 6,600,923 B1 | 7/2003 | Dzuban | |
| 7,076,504 B1 * | 7/2006 | Handel et al. | 1/1 |
| 2002/0049742 A1 * | 4/2002 | Chan et al. | 707/1 |

(Continued)

FOREIGN PATENT DOCUMENTS

| CN | 1254488 A | 5/2000 |
|---|---|---|
| CN | 1334523 A | 2/2002 |

(Continued)

OTHER PUBLICATIONS

PCT Application No. PCT/US2006/041566: International Search Report and Written Opinion of the International Searching Authority, Feb. 26, 2007, 10 pages.

(Continued)

*Primary Examiner* — Robert Beausoliel, Jr.
*Assistant Examiner* — Nirav K Khakhar
(74) *Attorney, Agent, or Firm* — Aaron Chatterjee; Kate Drakos; Micky Minhas

(57) ABSTRACT

A gamercard associated with an integrated gamer profile to identify a gamer is provided to the gamer and other PC/console users who also participate in other online gaming community activities such as game-related web sites. The gamercard is also provided to the user in a modular fashion formatted in a way suitable for the user to display it directly within other applications of the user (such as their personal web sites and mobile device applications for display on their cell phone) without the user having to update the information within the other applications when the information changes in the central database.

20 Claims, 7 Drawing Sheets

(56) References Cited

U.S. PATENT DOCUMENTS

| | | | |
|---|---|---|---|
| 2002/0059201 A1* | 5/2002 | Work | 707/3 |
| 2002/0061780 A1* | 5/2002 | Matsuno et al. | 463/42 |
| 2002/0090996 A1* | 7/2002 | Maehiro | 463/42 |
| 2002/0098890 A1* | 7/2002 | Sakaguchi | 463/42 |
| 2003/0045360 A1* | 3/2003 | Hora | 463/42 |

FOREIGN PATENT DOCUMENTS

| | | |
|---|---|---|
| CN | 1383078 A | 12/2002 |
| EP | 1262218 A2 | 12/2002 |
| EP | 1275423 A2 | 1/2003 |
| EP | 1553511 A1 | 7/2005 |
| JP | 2002-346232 A | 12/2002 |
| JP | 2003-281142 A | 10/2003 |
| KR | 2000-0054783 | 9/2000 |
| KR | 2001-0067847 | 7/2001 |
| KR | 2002-0007092 | 1/2002 |
| KR | 10-0389687 | 6/2003 |
| KR | 2003-0048275 | 6/2003 |
| WO | WO 02/089937 A1 | 11/2002 |

OTHER PUBLICATIONS

Supplementary European Search Report issued for European Application No. EP06826604, Oct. 18, 2012, 2 pages.

* cited by examiner

EMBEDDED GAMER CARD ACROSS MULTIPLE DEVICES AND NETWORKS

BACKGROUND OF THE INVENTION

In online gaming a multimedia console gamer has a gamer profile that was unique to the console they play on. When they play games on the console, the user profile information for those games is stored in locally on a memory unit or hard drive. When that same user surfs the web and specifically, participates in any sort of forum on the web, they can not view, access, or contribute to that locally stored profile. There is no ability for users to view, access, and/or contribute to their console gamer profile using the game-related web sites or other servers than the online gaming service.

Also, gamers who first participate in game-related forums on the internet and the web before participating in online gaming, have no way to easily connect their game-related identity and profile on the internet and the web to the online gaming identity and profile created once they choose to participate in online gaming. Additionally, there is no ability for gamers to integrate into one identity the profile information particular to that created during the online gaming participation (such as game achievements, for example) to other user profile information particular to that created when participating in the game-related forums within web sites (such as reputation ratings, for example).

Furthermore, the console game-related identity of a user, which may include a subset of the gamer profile information selected for public viewing, is not available to the user or other users outside the online gaming service, nor is it able to be moved and embedded easily into the user's or other user's web sites, PC desktops, or other devices such as PDA's or cellular phones.

In view of the foregoing, there is a need for a system that overcomes the drawbacks of the prior art.

SUMMARY OF THE INVENTION

A user is provided a set of gamer profile information selected for public viewing from user profile information stored in a central database when the user connects to a service and requests such information. The selected information is provided to the user in a modular fashion formatted in a way suitable for the user to display directly within other applications of the user without the user having to update the information within the other applications when the information changes in the central database.

The user profile information may be received through a user's use of an online gaming service that allows users to interact with each other over a network through a computer game, or through the user's use of a service for providing game-related information to users other than the service providing the online gaming service. The received user profile information is then stored the in a central database. Information selected for public viewing from the stored user profile information is provided to at least another user when the other user connects to a service other than that through which the user profile information was originally obtained and requests such information. Also, the information selected for public viewing may be a subset of the user profile information stored associated with that particular user.

BRIEF DESCRIPTION OF THE DRAWINGS

The foregoing summary, as well as the following detailed description of the invention, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

Figure 1:
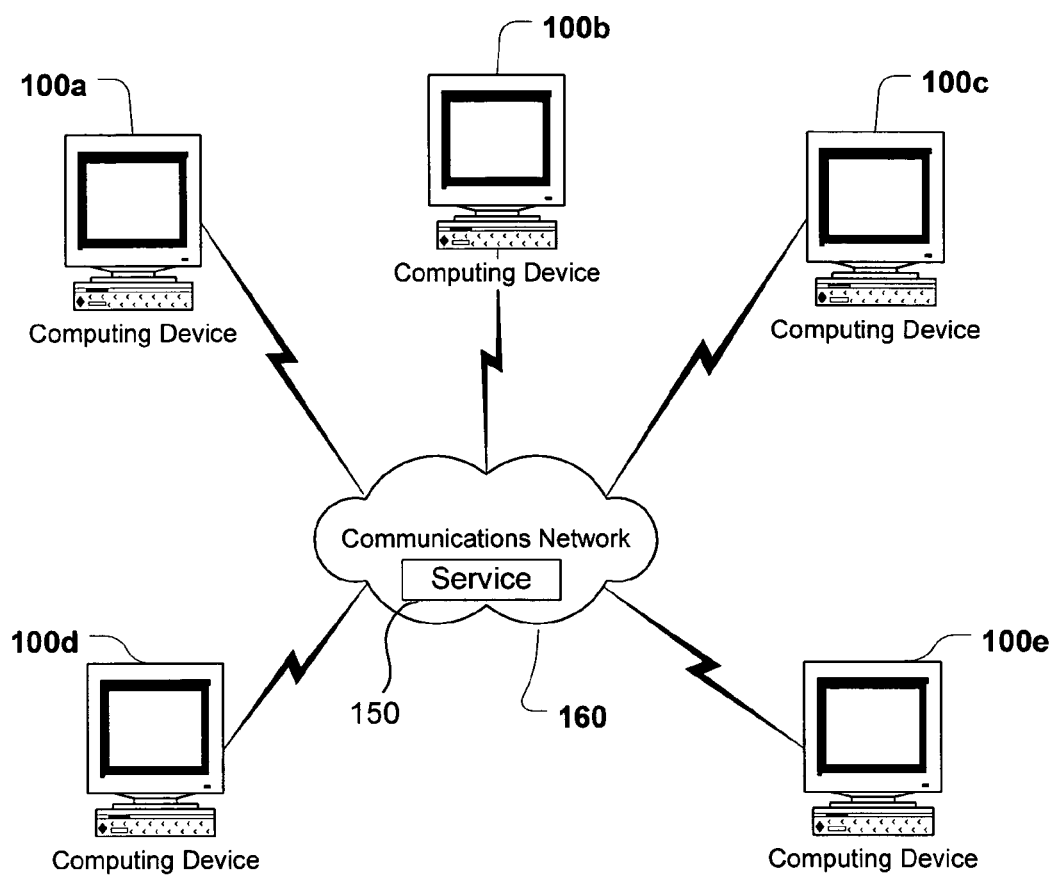
FIG. 1 is a block diagram of an exemplary computer network environment in which aspects of the present invention may be implemented.

FIG. 1 is diagram of an exemplary computer network that serves to illustrate aspects of the invention. Here computers 100a-100e may host various ones of the computing objects such as games and other applications. Although the physical environment shows the connected devices as computers, such illustration is merely exemplary and may comprise various digital devices such as PDAs, game consoles, etc. Moreover, communications network 160 may itself comprise a number of computers, servers and network devices such as routers and the like.

There are a variety of systems, components, and network configurations that support distributed computing environments. For example, computing systems may be connected together by wireline or wireless systems, by local networks or widely distributed networks. Currently, many of the networks are coupled to the Internet which provides the infrastructure for widely distributed computing and encompasses many different networks. Aspects of the present invention could be usable to distribute computer-readable instructions, code fragments, applications and the like to various distributed computing devices.

The network infrastructure enables a host of network topologies such as client/server, peer-to-peer, or hybrid architectures. The "client" is a member of a class or group that uses the services of another class or group to which it is not related. Thus, in computing, a client is a process (i.e., roughly a set of instructions or tasks) that requests a service provided by another program. The client process utilizes the requested service without having to "know" any working details about the other program or the service itself. In a client/server architecture, particularly a networked system, a client is usually a computer that accesses shared network resources provided by another computer (i.e., a server). A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Clients and servers communicate with one another utilizing the functionality provided by a protocol layer. For example, Hypertext-Transfer Protocol (HTTP) is a common protocol that is used in conjunction with the World Wide Web (WWW) or, simply, the "Web." Typically, a computer network address such as a Uniform Resource Locator (URL) or an Internet Protocol (IP) address is used to identify the server or client computers to each other. Communication among computing devices is provided over a communications medium. In particular, the client and server may be coupled to one another via TCP/IP connections for high-capacity communication.

In general, the computer network may comprise both server devices and client devices deployed in a network environment (in a peer-to-peer environment devices may be both clients and servers). Communications network 160 may be a LAN, WAN, intranet or the Internet, or a combination of any of these that facilitates communication among a number of computing devices 10a-10e. Moreover, communication network 160 may comprise wireless, wireline, or combination wireless and wireline connections. Additionally, the computer network may comprises a distributed computing environment. In such an environment a computing task may be spread over a number of computing devices that are addressable elements in a computer network.

According to an aspect of the invention, communication network 160 may host a service 150 that is accessible from the plurality of computers 100a-100e. The service 150 gathers information and tracks users of computers 100a-100e to provide computing services for all of the users of the service.

Figure 2:
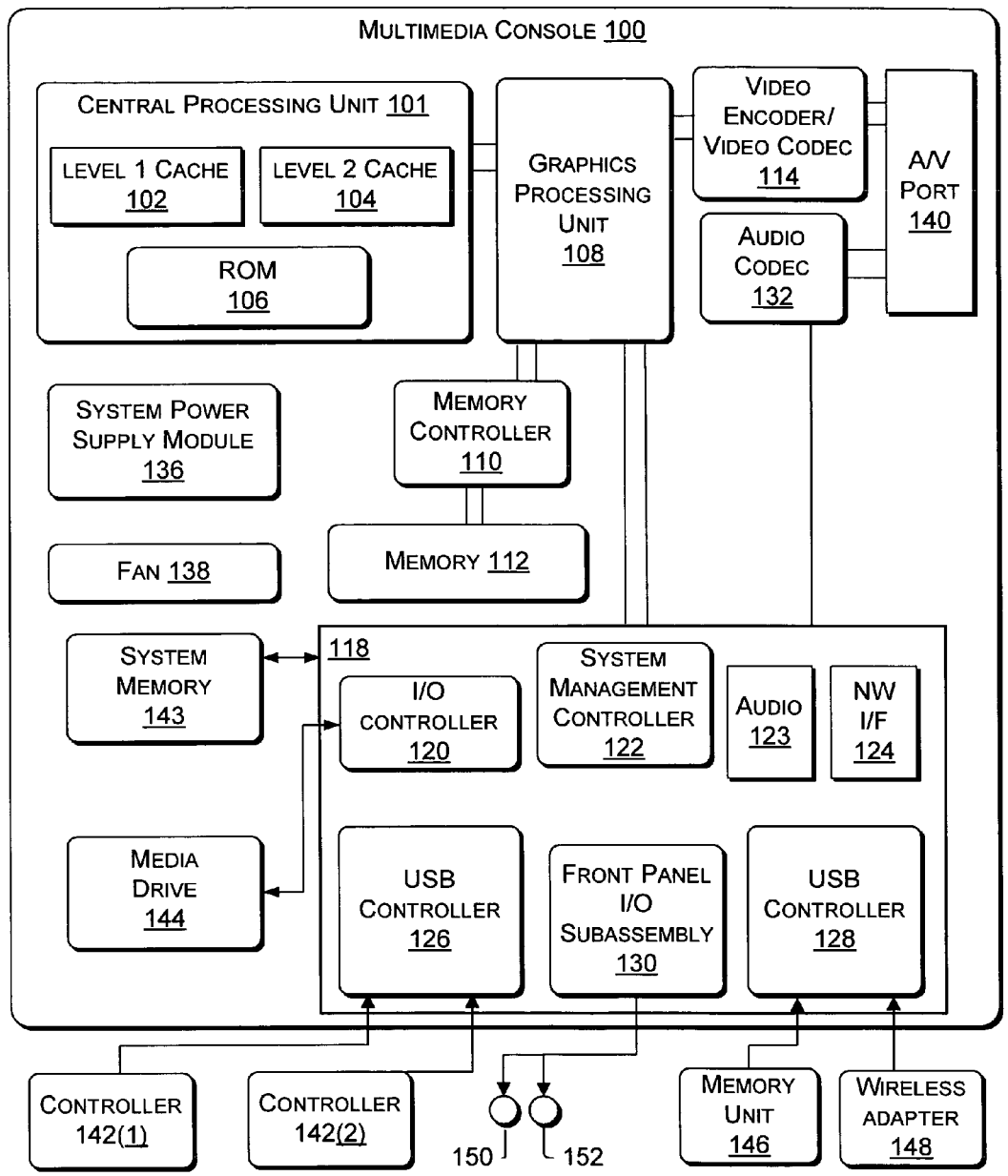
FIG. 2 is a block diagram illustrating an exemplary console that can be incorporated into a network computing environment such as the network computing environment of FIG. 1.

FIG. 2 illustrates the functional components of a multimedia/gaming console 100 that may be used as the computers 100a-100e in the network of FIG. 1. The multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in the larger network community as illustrated in FIG. 1.

According to an aspect of the invention, when a game is executed on console 100, it provides information to an online gaming service 150 operating on communications network 160. The online gaming service 150 tracks the information for all of the users connected to the online gaming service 150 to provide a rich user experience. The online gaming service 150 tracks user information across games, consoles, computing devices, etc. By tracking the information for all users of the online gaming service 150, the online gaming service can aggregate statistics for all users and measure game playing ability, provide a richer user experience by providing information about friends (e.g., what game they are playing and what skill level they have attained), track user achievements and generally measure statistics for a game aggregated over a large user community.

In order to provide a consistent data set across games, the invention contemplates a schema driven process where each game generates a schema that defines the game data for a particular game. Through a game configuration process, games use a service-defined schema to describe the data the game generates about each game player. By using the configuration process, the online gaming service 150 will be able to understand the data as it flows from the game, and it will be able to integrate it in meaningful ways with the other data that the online gaming service 150 understands to create a rich profile of each user of the online gaming service. The profile will follow the user wherever he goes on the online gaming service 150, i.e. it is game and location independent. Some of the profile, in fact, will be viewable by every user of the online gaming service 150.

Figure 3:
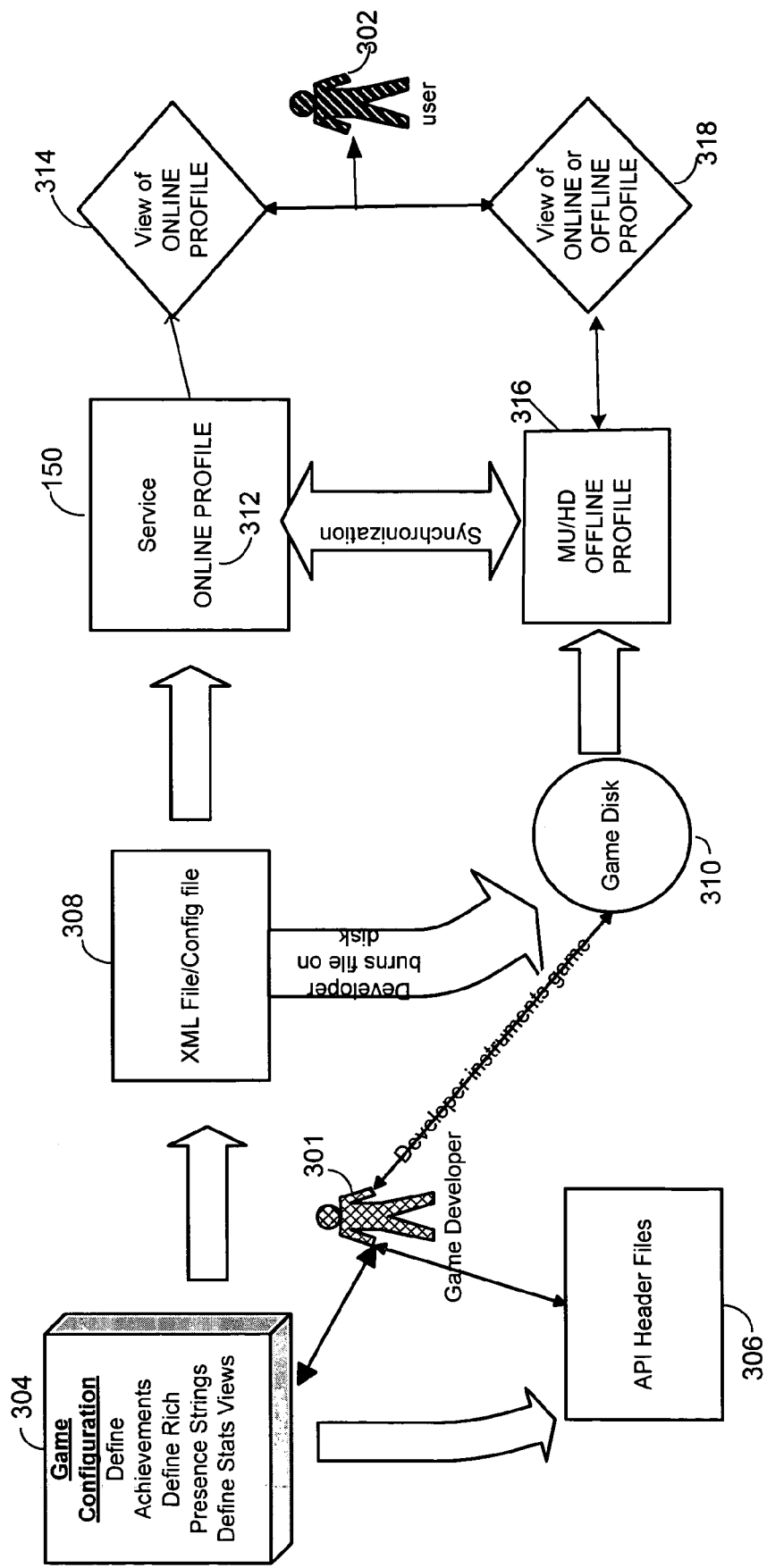
FIG. 3 illustrates the overall system of allowing a game application to communicate with an online gaming service.

FIG. 3 illustrates the overall process that allows a game developer to configure a game for use with the online gaming service 150. A game developer 301 wants to create a game for use with the online gaming service 150 by user 302. To that end, the developer provides a set of game configuration data 304 that will be shared with the online gaming service 150. The output from the use of the tool is a set of API header files 306 that are included with the game to communicate with the online gaming service 150 and a set of xml files 308 that define the schema of the data to be shared with the online gaming service 150. Game developer 301 then burns a game disk 310 or creates a game program that contains the game code instrumented with the APIs 306 an the XML schema files 308 (or an equivalent representation). The XML files 308 are also communicated to the online gaming service 150 so that the online gaming service 150 can use the data output from the game to update the online user profile 312 for user 302 when user 302 uses the game 310 online. When user 302 uses game 310 without a network connection, information is collected and stored on the users offline profile in a hard drive or memory unit 316. Thereafter, when user 302 connects to the online gaming service 150, the online and offline profile is synchronized. User 302 can then view profile information locally 318, i.e. on the console 100 or PC or log on to the online gaming service 150 and view the user profile 314. Also, as explained in further detail below, the user is able to log on to a separate gaming web site to view the integrated online gamer profile or create it on the web site for the first time.

Figure 4:
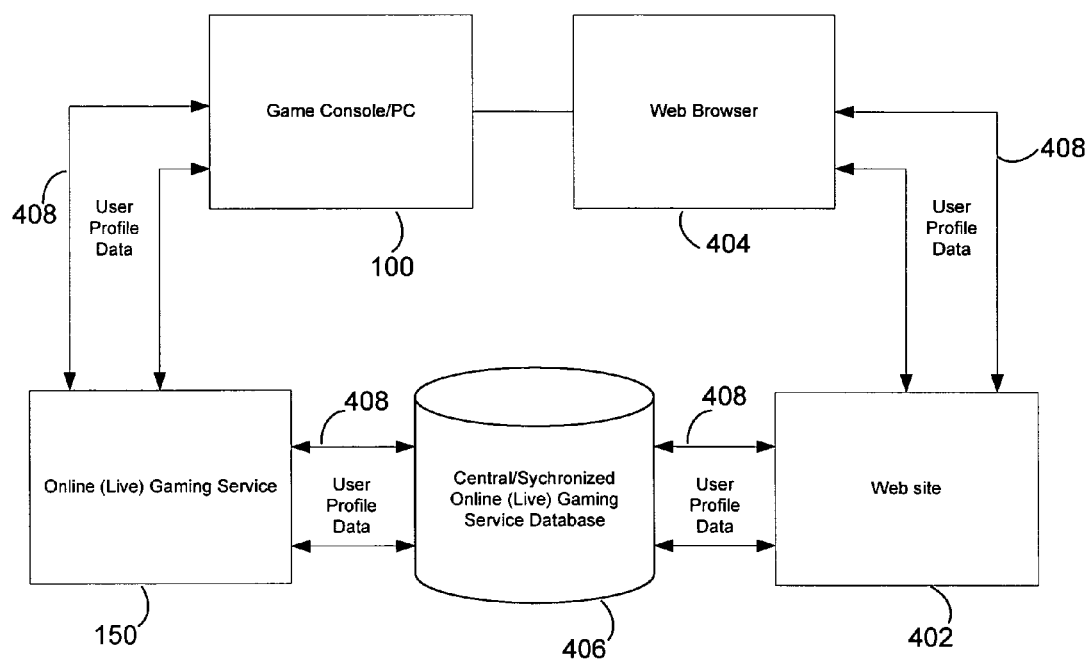
FIG. 4 illustrates the overall system of providing an integrated gamer profile across an online gaming service, gaming World Wide Web (web) site, and multiple devices.

Referring next to FIG. 4, shown is a diagram that illustrates the overall system of providing an integrated gamer profile 312 across an online gaming service 150, gaming web site 402, and multiple devices, for example, such as a game console or PC 100, or any device running a web browser 404. The user 302 can use credentials received from creating the online profile 312 with the online gaming service 150 to log onto a gaming web site 402 using any web browser 404. The web browser 404 may be running on the game console/PC 100, or any device connected to the web. However, using the web is provided as an example, and other communication and computer networks besides the web may be used to communicate and modify user profile data as described herein. The gaming web site 402 will have the online profile 312 information for that user created from the online gaming service to create an online integrated profile 312 to present at the web site 402. This is because both web site 402 and online gaming service 150 are communicatively connected (for example, over a network 160 as shown in FIG. 1) to a central/synchronized online gaming service database 406 which stores and synchronizes the user profile data 408 received from both the online gaming service 150 and the gaming web site 402.

Figure 5:
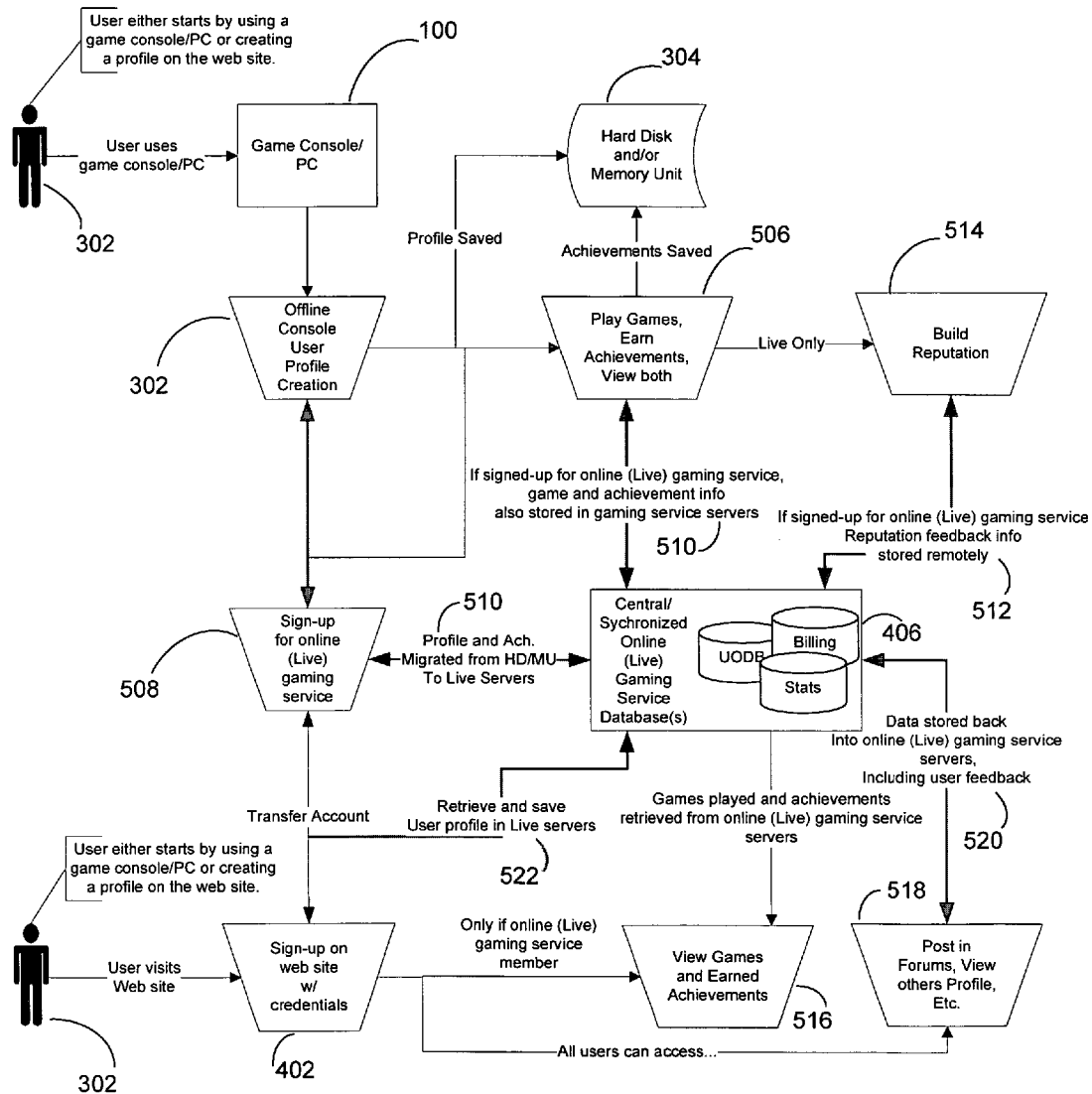
FIG. 5 is a system and flow diagram that illustrates the creation and maintenance of an integrated gamer profile across an online gaming service, gaming web site, and multiple devices.

Referring next to FIG. 5, shown is a system and flow diagram that illustrates the creation and maintenance of an integrated gamer profile 312 across an online gaming service 150, gaming web site 402, and multiple devices. A user creates the integrated gamer profile 312 one of two different ways, either starting from the game console/PC 100 or from the gaming web site 402. In the case of starting from the game console/PC 100, the user first creates an offline gamer profile 502 that is stored locally on a hard drive or memory unit 504 as described above with reference to FIG. 3, for example. The user can play games, earn achievements, get high scores, and view 506 all this information locally from the game console/PC 100. The user 302 then signs-up 508 for the online gaming service 150 and that offline gamer profile is now stored 510 and available in the central/synchronized online gaming service database(s) 406, making the games played, achievements, and scores available to any other user that is a member of the online gaming service 150. Additionally, the other members of the online gaming service can submit feedback 512 about that user 302, helping to build that individuals reputation 514 within the gaming community and the user can have a user selected zone that refers to the user's style and preference of game play.

Due to the integrated gamer profile 312 information being stored in the online gaming service database 406, when the user 302 now signs into the gaming web site 402, he/she can sign-in using his/her credentials, such as a user name and password, (e.g., using Microsoft® Passport) from creating 508 the online gaming service 150 account and view, access, and contribute 516 to that gamer profile 312 while participating in various activities on the web site 402. These activities may include, among others, posting comments in community forums and viewing other gaming web site members profiles 518. This includes displaying that user's gamer card 602 (example shown in FIG. 6). The gamer card 602 may, for example, be a subset of information from the users gamer profile 312 that includes a gamertag (i.e., gamer alias or name) 604, picture 606, gamer score 608, gamer zone 610 that refers to the user's style and preference of game play, reputation 612, and the most recent games the user has played 614. Based on the users 302 activities on the web site 402, other users can submit feedback 518 on the user 302 and impact that user's 302 reputation 612.

Activities that happens around the user 302, whether it is on the console/PC 100 or on the gaming web site 402, is stored back 510 512 520 522 to the central/synchronized online gaming service database(s) 406, enabling one integrated gamer profile 312 that users 302 from either the console/PC 100 and/or web site 402 community can view and interact with while also allowing the user 302 to maintain one identity.

Figure 6:
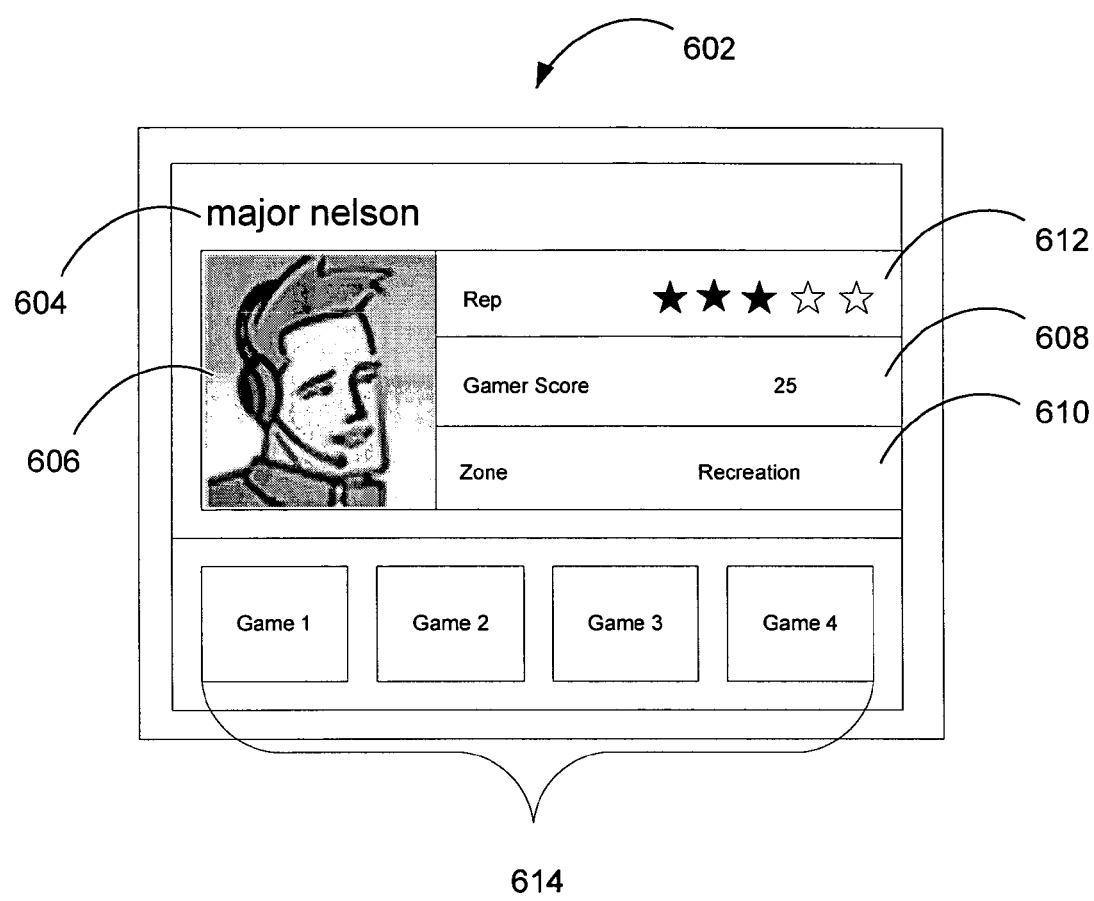
FIG. 6 depicts an example of a gamer card which displays information from a gamer profile for identifying a gamer to others across multiple devices and networks.

Referring next to FIG. 6, depicted is an example of a gamer card 602 which displays information from a gamer profile 312 for identifying a gamer 302 to others across multiple devices and networks. To expand on the explanation of a gamer card 602 above, a gamer card is set (often a subset) of the user profile information 312 described above selected to be presented to the public, other gamers, and/or other members of the gaming community. As an example, a gamer card would provide information about the gamer associated with that gamer card to identify that gamer to other members of the game-related web site or forum 402 and/or other members of the online gaming service 150. The gamer card may include and display items such as the gamer's alias (i.e., gamertag)

604, a picture associated with the gamer 606, and various statistics related to the gamer's performance 608 in playing various console or computer games, and reputation 612 determined by those other members of the game-related web site 402 or forum 402 and/or other members of the online gaming service 150. However, a gamer card 602 may provide more, less or different types of information associated with a gamer 302 than in the example provided herein.

Figure 7:
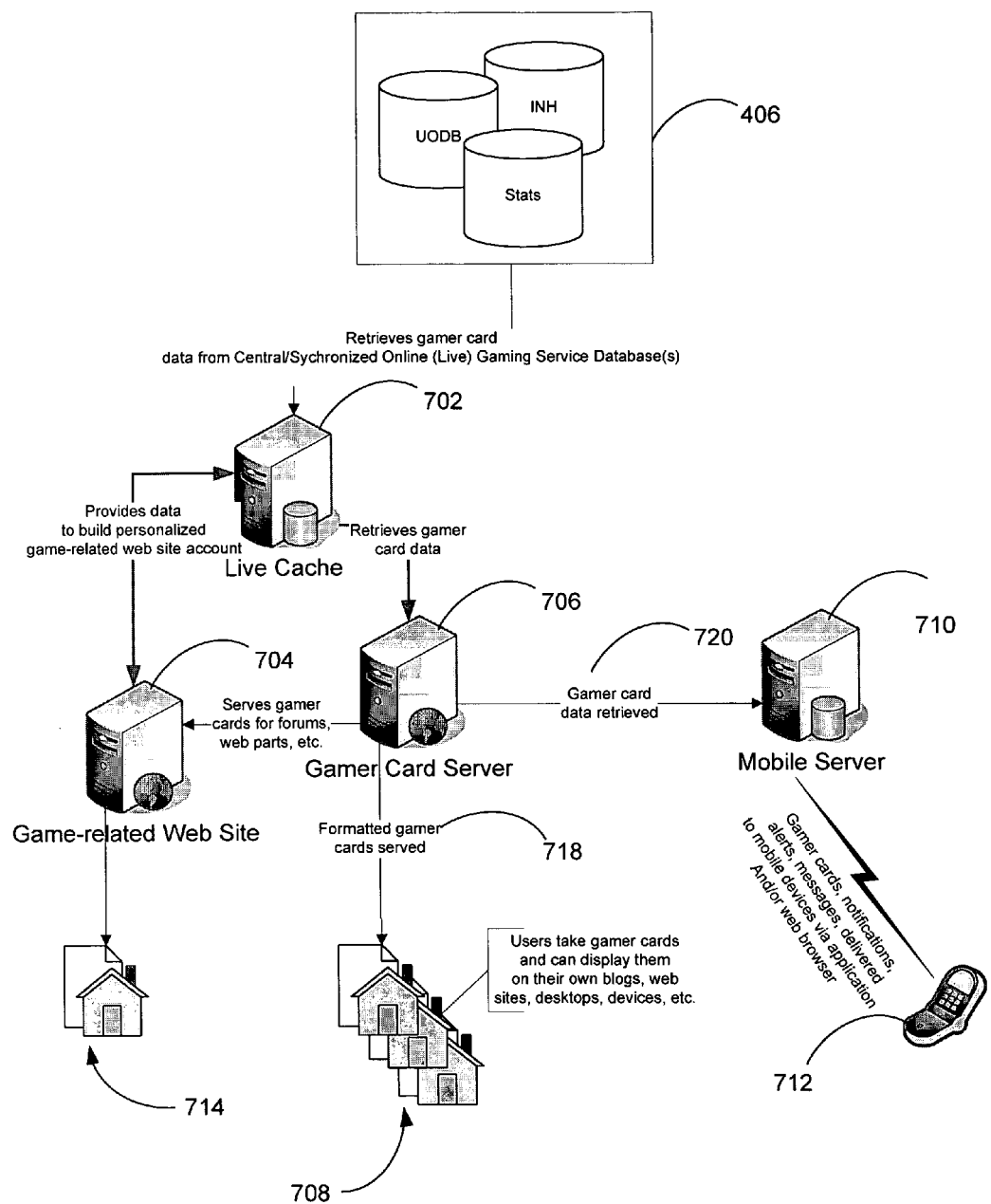
FIG. 7 is a diagram illustrating a system that provides embedded gamer cards such as the example shown in FIG. 6 across multiple devices and networks using the gamer profile information of the system described in FIGS. 1 through 6.

Referring next to FIG. 7, shown is a diagram illustrating a system that provides embedded gamer cards 602 such as the example shown in FIG. 6 across multiple devices and networks using the gamer profile 312 information of the system described in FIGS. 1 through 6. Shown is the central/synchronized online gaming service database(s) 406, making the information of the gamer profile 312 including that provided in a gamer card 602 (such as games played 614, achievements 608, scores 608 612, etc.) available to the live cache server 702. Therefore, in conjunction with the offline gamer profile created as described above, it is possible for users to play a game offline and when/if they ever connect to the online gaming service, those games played and achievements will appear on the gamer card 602. The live cache server 702 fulfills requests from various other servers for gamer card 602 and other gamer profile 312 data that was originally obtained from the central/synchronized online gaming service database(s) 406. These include, for example, the game-related web site server 704 to build personalized game-related web site accounts and the gamer card server 706 that distributes formatted gamer card 602 data. The gamer card 602 server 706 providing formatted gamer cards 602 enables users to take gamer cards 602 and display them on their own personal web logs (blogs), web sites, desktops and other devices 708. The central storage of this gamer card 602 information provides the ability to disseminate the information in various formats to servers 710 706 704 (i.e. raw data, images) which in turn distribute this gamer card information to various different form factors (e.g. PC, mobile devices 712) and multiple different end consumers 708 714.

In particular, the gamer card 602 data is displayed in various locations across the game-related web site, including a users profile page 714 and when they post in the game-related web site forums. Also, applications are created for use on various devices such as cell phones, personal digital assistants (PDAs), etc., that render the gamer card 602 to end users for viewing, editing, and contributing to the pieces of information in a users gamer profile 312. For example, a gamer card is delivered to a mobile device such as a cell phone 712 via a web browser running on the phone 712, or other application running on the phone 712 intended to render the gamer card 602 from the formatted gamer card 602 information received from the mobile server 710. The central gamer card server 706 will also allow external partners (i.e. game publishers, press, other internal groups) to easily access user information and render the gamer card 602 information in their application and/or environment. This takes the concept of the integrated gamer profile 312 from the game console/PC 100 to the game-related web site 714 forums and to any external partners web site and/or application. The central gamer card server 706 allows individual users 302 to easily access their gamer card 602 in a formatted iframe 718 as well as in raw data format 720 to display as they please on any device. Due to the links provided to the gamer card server 718 in the formatted iframe, changes to the user profile 312 in the central database 406 will be reflected in the updated gamer-card shown within the other devices and applications without the user having to manually update the information within the other devices and applications.

In addition, central gamer card server 706 provides a mechanism for a user to easily access other userss gamer cards 602 by typing in a uniform resource locater (URL) associated with the other user's gamertag 604 to any web browser application running on any device connected to the web. As an example, the URL for a particular user's gamer card 602 would follow the format below where the user's actual gamertag is substituted for "gamertag" to bring up that users gamer card 602 in the browser.

http://live.xbox.com/member/gamertag

For example, referring again to FIG. 6, a user typing:

http://live.xbox.com/member/major nelson into their web browser would bring up the gamer card 602 example shown in FIG. 6 for a user with the gamertag "major nelson."

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A method for providing user profile information comprising:
   receiving user profile information through a user's use of an online gaming service that allows users to interact with each other over a network through a computer game;
   receiving user profile information through the user's use of a second service that provides game-related information to users, wherein the second service is distinct from the online gaming service and wherein the user profile information received through use of the second service can be modified through use of the online gaming service;
   synchronizing and storing the user profile information received in a central database that stores and synchronizes user profile information, including modified user profile information, received from both the online gaming service and from the second service; and
   providing information selected for public viewing from the stored user profile information to another user, device or application, wherein modifications of the selected information in the central database are reflected in the selected information provided to other users, devices and applications without manually updating the selected information and wherein the selected information received through a user's use of the online gaming service is viewable through the service for providing game-related information and vice versa.

2. The method of claim 1 wherein the providing information selected for public viewing from the stored user profile information comprises:
   obtaining by the service other than that through which the user profile information was originally obtained, from a server communicatively connected to the central database, said selected information for public viewing.

3. The method of claim 1 wherein the second service is a game-related web site.

4. The method of claim 1 wherein the selected information is a subset of the user profile information.

5. The method of claim 1 wherein the providing information selected for public viewing comprises:
   providing the selected information to the other users mobile device such that it can be displayed on the user's mobile device.

6. The method of claim 1 further comprising:
   providing the selected information to the user and other users formatted in a way suitable for the user and other users to display on their web sites.

7. The method of claim 1 wherein the selected information for public viewing comprises a gamer tag associated with the user, a picture associated with the user, statistical information reflecting the user's performance in multiple different games, a reputation of the user that is gathered from feedback from other users, and a user selected zone that refers to the user's style and preference of game play.

8. A non-transitory computer readable program storage device comprising executable instructions that when executed by a processor cause the processor to effectuate operations comprising:
   receiving user profile information through a user's use of an online gaming service that allows users to interact with each other over a network through a computer game;
   receiving user profile information through the user's use of a second service that provides game-related information to users, wherein the second service is distinct from the online gaming service and wherein the user profile information received through use of the second service can be modified through use of the online gaming service;
   synchronizing and storing the user profile information received in a central database that stores and synchronizes user profile information, including modified user profile information, received from both the online gaming service and from the second service; and
   providing information selected for public viewing from the stored user profile information to another user, device or application, wherein modifications of the selected information in the central database are reflected in the selected information provided to other users, devices and applications without manually updating the selected information and wherein the selected information received through a user's use of the online gaming service is viewable through the service for providing game-related information and vice versa.

9. The non-transitory computer readable program storage device of claim 8, wherein the providing information selected for public viewing from the stored user profile information comprises:
   obtaining by the service other than that through which the user profile information was originally obtained, from a server communicatively connected to the central database, said selected information for public viewing.

10. The non-transitory computer readable program storage device of claim 8, wherein the second service is a game-related web site.

11. The non-transitory computer readable program storage device of claim 8, wherein the selected information is a subset of the user profile information.

12. The non-transitory computer readable program storage device of claim 8, wherein the providing information selected for public viewing comprises: providing the selected information to the other users mobile device such that it can be displayed on the user's mobile device.

13. The non-transitory computer readable program storage device of claim 8, the method further comprising: providing the selected information to the user and other users formatted in a way suitable for the user and other users to display on their web sites.

14. The non-transitory computer readable program storage device of claim 8, wherein the selected information for public viewing comprises a gamer tag associated with the user, a picture associated with the user, statistical information reflecting the user's performance in multiple different games, a reputation of the user that is gathered from feedback from other users, and a user selected zone that refers to the user's style and preference of game play.

15. A system having one or more program storage devices storing computer executable instructions for providing user profile information, the computer executable instructions comprising:
   means for receiving user profile information through a user's use of an online gaming service that allows users to interact with each other over a network through a computer game;
   means for receiving user profile information through the user's use of a second service that provides game-related information to users, wherein the second service is distinct from the online gaming service and wherein the user profile information received through use of the second service can be modified through use of the online gaming service;
   means for synchronizing and storing the user profile information received in a central database that stores and synchronizes user profile information, including modified user profile information, received from both the online gaming service and from the second service; and
   means for providing information selected for public viewing from the stored user profile information to another user, device or application, wherein modifications of the selected information in the central database are reflected in the selected information provided to other users, devices and applications without manually updating the selected information and wherein the selected information received through a user's use of the online gaming service is viewable through the service for providing game-related information and vice versa.

16. The system of claim 15 wherein the means for providing information selected for public viewing from the stored user profile information comprises:
   means for obtaining by the service other than that through which the user profile information was originally obtained, from a server communicatively connected to the central database, said selected information for public viewing.

17. The system of claim 15 wherein the selected information is a subset of the user profile information.

18. The system of claim 15 wherein the providing information selected for public viewing comprises:
   means for providing the selected information to the at least another user's mobile device such that it can be displayed on the user's mobile device.

19. The system of claim 15, the computer executable instructions further comprising:
   means for providing the selected information to the user and other users formatted in a way suitable for the user and other users to display on their web sites.

20. A method for providing user profile information comprising:

providing to a user a set of synchronized gamer profile information selected for public viewing from user profile information stored in a central database, said selected information provided to the user in a modular fashion formatted and linked in a way suitable for the user to display directly within other applications of the user without the user having to update the information within the other applications when the information changes in the central database, wherein the central database receives, stores and synchronizes the user profile information from a plurality of different services comprising an online gaming service and a separate web site distinct from the online gaming service, wherein the set of synchronized gamer profile information can also be provided to other users, devices and applications and wherein modifications of the selected information in the central database are reflected in the set of synchronized gamer profile information provided to other users, devices and applications without manually updating the selected information.

* * * * *